United States Patent [19]
Welsch

[11] 3,713,255
[45] Jan. 30, 1973

[54] MINIATURE BELT GRINDER
[75] Inventor: Walter N. Welsch, Tonawanda, N.Y.
[73] Assignee: Dynabrade, Inc., N. Tonawanda, N.Y.
[22] Filed: Sept. 29, 1971
[21] Appl. No.: 184,794

[52] U.S. Cl. ............................... 51/170 EB, 51/135
[51] Int. Cl. ........................ B24b 23/00, B24b 21/00
[58] Field of Search .................... 51/170 EB, 135 R

[56] References Cited
UNITED STATES PATENTS
3,427,757  2/1969  Redman ........................ 51/170 EB
3,619,943  11/1971  Welsch et al. .................. 51/170 EB Primary Examiner—Othell M. Simpson
Attorney—Bean & Bean

[57] ABSTRACT

A hand tool grinder having an endless belt entrained about non-parallel drive and idler pulleys such that the flights thereof pass over a pair of crown-surfaced direction change pulleys featuring the interchangeable mounting of idler pulleys having differing diameters and axial lengths on the end of a pivotally supported arm; the construction of the arm adjustably accommodating for differing idler pulley diameters and belt lengths.

2 Claims, 3 Drawing Figures

PATENTED JAN 30 1973
3,713,255
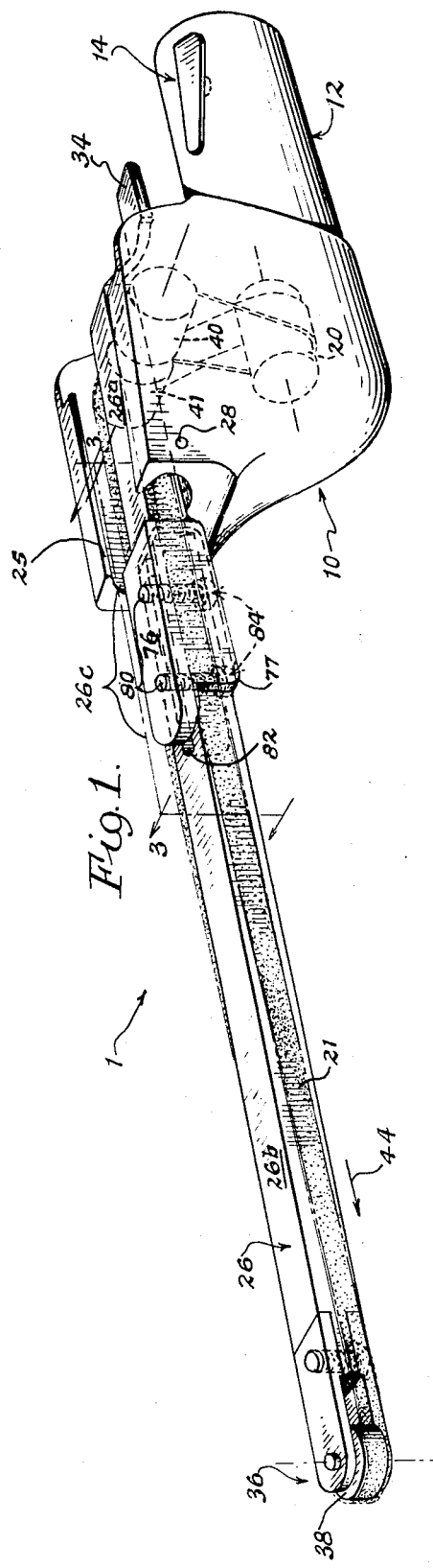
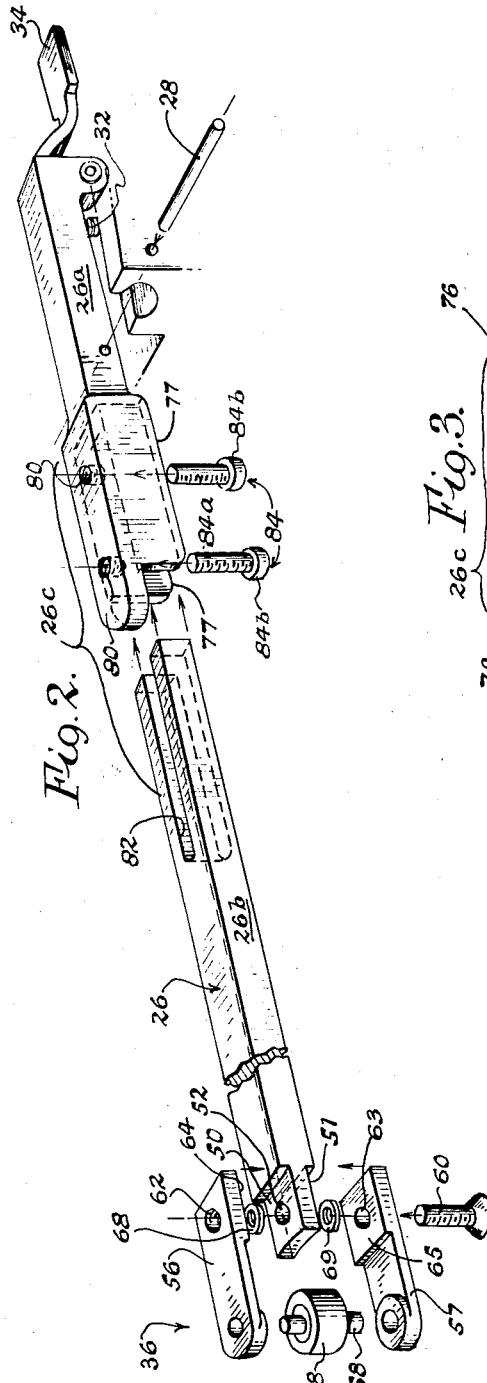
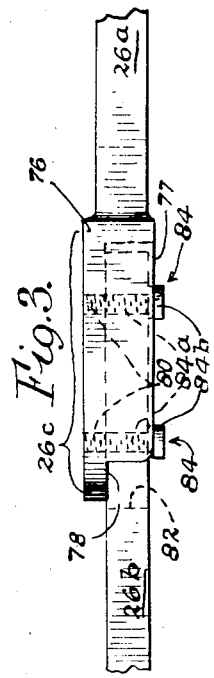
INVENTOR.
WALTER N. WELSCH
BY
Bean & Bean
ATTORNEYS

MINIATURE BELT GRINDER

SUMMARY OF THE INVENTION

The invention relates to hand tool grinders particularly adapted for use in connection with small cavities or restricted openings in sheet metal, castings, forgings and the like for deburring and smooth finishing.

Grinders in which the present invention possess utility feature an endless abrasive surfaced belt; a casing; drive means including a belt driving pulley mounted within the casing and having its axis of rotation extending generally longitudinally with respect to the casing; an elongate arm mounted on the casing and projecting longitudinally therefrom; a belt supporting idler pulley mounted on a projecting end of the arm and having its axis of rotation extending generally vertically with respect to the casing; and a pair of direction change pulleys mounted on the arm for respectively supporting flights of the belt extending between the drive and idler pulleys, the direction change pulleys having their axes of rotation extending generally transversely of the casing and causing portions of the flights extending between the direction change pulleys and the idler pulley to undergo a substantially 90° twist and to straddle that portion of the arm projecting from the casing.

The present construction features an assembly for interchangeably mounting idler pulleys of differing diameters and axial lengths, as required by access opening sizes and belt widths; and an arm construction adjustably accommodating for different idler pulley diameters and belt lengths.

DRAWINGS

The present invention will now be more fully described with reference to the accompanying drawings wherein:

FIG. 1 is a perspective view of a tool embodying the present invention;

FIG. 2 is an exploded perspective view showing the arrangement for mounting a belt supporting idler pulley and for coupling the arm parts; and FIG. 3 is a fragmentary side elevational view showing the arm coupling arrangement illustrated in FIG. 2.

DETAILED DESCRIPTION

Now referring to the drawings in detail, the tool of the present invention is generally designated as 1 and shown as having a casing 10 to the rear of which is mounted a suitable pneumatically operated motor 12 to be grasped by the hand of an operator for the purpose of manipulating the tool. Motor 12 may have any suitable shut-off or speed control, such as a pivotally supported lever 14, which is adapted to be squeezed by the hand of the operator during use. However, it will be understood that the invention to be hereinafter described is not limited to the use of a pneumatically operated motor or the illustrated design of casing 10. Thus, as by way of example, the operating motor may be electric and housed within a casing having a piston like hand grip.

Extending forwardly of motor 12 through the rear of casing 10 is a drive shaft, not shown, for mounting a drive pulley 20 for rotation about an axis extending generally longitudinally of casing 10; pulley 20 serving to frictionally drive a flexible, endless abrasive belt 21.

Referring particularly to FIG. 1, it will be seen that the casing is cut away so as to define a through opening, and that an elongated arm device 26 is positioned in opening 25 and supported for pivotal movement about an axis extending transversely of casing 10 by a pivotal pin or shaft 28. A spring device, such as a coil spring 32 shown only in FIG. 2, is suitably mounted between the bottom of arm device 26 and an internal portion of casing 10 for the purpose of continuously biasing arm device 26 for pivotal movement about pivot pin 28 in counterclockwise direction, as viewed in FIG. 1. It will be understood that the spring device serves to maintain desired operating tension on belt 21, when the latter is mounted on tool 1 in the manner to be more fully described.

The rear end of arm device 26 terminates in a hand or thumb press lever extension 34, which may be employed to pivot the arm device clockwise against the bias of spring 32 in order to permit removal and replacement of belt 21.

As best shown in FIG. 1, arm device 26 projects forwardly of casing 10 and mounts adjacent the forward or freely projecting end thereof a support assembly 36, which journals an idler roller 38 for rotation about an axis extending vertically and at a substantially right angle to a line running lengthwise of arm device 26. It will be understood that in the normal operating position of arm device 26, shown in FIG. 1, the axis of idler pulley 38 also extends substantially vertically with respect to casing 10.

A pair of crown-surfaced direction change pulleys 40 and 41 are supported on arm device 26 for rotation about axes, which extend generally transversely of both arm device 26 and casing 10. Preferably, the axis of pulley 41 is arranged at an angle of between about 1° and 3° relative to the axis of pulley 40, as set forth in co-pending application Ser. No. 45,629, filed June 12, 1970. As will be apparent from the drawings, pulleys 40, 41 serve to support the flights of belt 21 extending between idler pulley 38 and drive pulley 20, such that each flight of the belt is turned through substantially 90° in that portion thereof extending between drive pulley 20 and the direction change pulleys, and again through substantially 90° in that portion thereof extending between the direction change pulleys and idler pulley 38. During the latter portion of the belt flights, belt 21 is forced to closely straddle arm device 26, thereby insuring that the belt affords a small frontal area in order to facilitate entry thereof through restricted access openings.

In the arrangement illustrated, belt 21 is driven by drive pulley 20 for movement in the direction indicated by arrow 44, such that direction change pulleys 40 and 41 may be characterized as forward and return pulleys, respectively.

Normally, it is desired to employ the maximum width of belt, which is consistent with the direction change pulley size and casing clearance considerations in order to maximize the belt area available for grinding and/or polishing operations. Thus, the maximum width of belt 21 determines the maximum required axial length of idler pulley 38. Also, it is normally desirable to maximize the diameter of idler pulley 38 in order to "flatten" the belt as much as possible, thereby reducing grooving of the work when the idler pulley forms a back up support for the belt against the work. Moreover, in order to minimize the weight of the tool and prevent same from becoming cumbersome, it is also desirable to minimize the length of arm device 26.

However, where cramped operating conditions exist, as for instance where the tool must be passed through a relatively small access opening, it will be necessary to reduce the dimension of both the idler pulley and its supporting assembly as much as possible. Also, where the surface to be finished is relatively remote from an outer surface of a casting or other object being finished, it is necessary to form the arm device of a length, which may be substantially greater than that normally required or desired.

To achieve the above objects, the present construction provides for removably mounting various sizes of idler pulleys and for selectively varying the length of arm device 26.

To this end, the free end of the projecting portion of arm device 26 is of generally square cross-sectional design and provided with end opening cutouts 50, 51 disposed on the relatively upper and lower surfaces thereof and a vertically extending through bore opening 52; and support assembly 36 is formed as a unit including a pair of plate members 56 and 57, which retain the ends of idler pulley mounting shaft 58. Assembly 36 is removably mounted by passing a machine screw 60 though plate member openings 62 and 63 and arm bore opening 52; plate member bosses 64 and 65 being wholly or partially received within cutouts 50, 51 in order to lock assembly 36 against rotation relative to arm device 26 about the axis of screw 60. Idler pulley 38 is provided with suitable bearing devices, not shown, by which the pulley is journaled on shaft 58.

When a maximum length idler pulley is employed in order to accommodate a maximum width belt, apertured discs 68 and 69, shown only in FIG. 2, are employed to space plate member bosses 64 and 65 from the planar supporting surfaces of end opening cutouts 50 and 51. As the width of the belt and thus the axial length of the idler pulley required to be employed is decreased in order to permit passage of the tool through more confined access openings, the thickness of discs 68 69 employed will be decreased in order to reduce the distance between plate members 56 and 57. When discs 68 and 69 are omitted, plate members 56 and 57 are disposed flush with the upper and lower surfaces of arm device 26, as shown in FIG. 1, thereby permitting entrance of the tool to be limited only by the size of the arm device. It will be understood that the use of discs 68 and 69 permit the same sized plate members to be employed in forming each of the support assembly units, and thus simplifies the construction, minimizes inventory requirements and reduces costs. Also, it will be understood that the plate members are formed such that the distance between shaft 58 and their respective bosses is sufficient to accommodate for the several idler pulley diameters, which may be desirably employed with the tool.

Again referring to the drawings, it will be seen that arm device 26 includes a first part 26a, which is pivotally mounted on pin shaft 28; a second part 26b, which serves to mount support assembly 36; and an attachment arrangement 26c, which serves to couple adjacent ends of parts 26a and 26b. Specifically, attachment arrangement 26c includes a flange portion 76, which projects lengthwise from part 26a and is formed with a pair of depending parallel leg portions 77 serving to bound a lower, generally horizontally disposed clamping surface 78 through which extend a pair of threaded openings 80; a vertically opening, through a slot 82, which extends lengthwise of part 26b; and a pair of threaded fastener devices 84. As will be apparent, fastener devices 84 are formed with screw threaded shank portions 84a, which are dimensioned to be freely received within slot 82; and enlarged head portions 84b, which are dimensioned to bear against the lower surface of part 26b for the purpose of clampingly securing such part in engagement with clamping surface 78 when shank portions 84a are threaded into openings 80. Depending leg portions 77 serve to slidably guide arm part 26b to position slot 82 in alignment with openings 80 and to thereafter cooperate with fastener devices 84 to prevent sidewise movements of arm part 26b relative to arm part 26a.

By the above arrangement, arm parts 26b of differing lengths may be readily mounted on the tool, as determined by working requirements, and lengthwise adjustments of the arm device may be made as required to accommodate for changes in diameter of the idler pulley to be employed. As will be apparent, these lengthwise adjustments of the arm device alternatively serve to take up slack or slacken belt 21, as required, thereby to permit the coil spring 32 to maintain a substantially conStant drive tension on the belt. Moreover, the design of coupling arrangement 26c affords a simple to use, low cost construction, and does not require an excessive increase in arm device thickness in a transverse direction, which would otherwise interfere with the proper running of belt 21.

I claim:

1. A hand tool grinding device having an endless abrasive surfaced belt, drive means, a casing for supporting said drive means, said drive means including a belt driving pulley having its axis of rotation extending generally longitudinally with respect to said casing, an elongate arm mounted on said casIng and projecting longitudinally therefrom, a belt supporting idler pulley mounted on a projecting end of said arm and having its axis of rotation extending generally vertically with respect to said casing, a pair of direction change pulleys mounted on said arm for respectively supporting flights of said belt extending between said drive and idler pulleys, said direction change pulleys having their axes of rotation extending generally transversely of said casing and causing portions of said flights extending between said directIon change pulleys and said idler pulley to undergo a substantially 90° twist and to straddle that portion of said arm projecting from said casing, the improvement wherein:

said elongated arm includes a first part pivotally mounted on said casing and mounting said direction change rollers thereon, a second part for mounting said idler pulley, and attachment means for coupling adjacent ends of said parts whereby said parts may be removably interconnected and the lengthwise dimension of said arm may be adjustably varied whereby to adjustably vary the distance between said idler pulley axis and said direction change pulleys, said attachment means including a flange portion projecting lengthwise from one of said adjacent ends to define a clamping surface through which extends at least two threaded openings spaced apart in a direction lengthwise thereof, a slot opening through and extending in a direction lengthwise of the other of said adjacent ends, and at least two fastener devices for releasably clamping said other adjacent end against said clamping surface, said fastener devices having screw threaded shank portions dimensioned to be freely accommodated within said slot and threadably received within said flange openings and enlarged head portions of a diameter in excess of the width of said slot.

2. In a hand tool grinding device according to claim 1, wherein said flange is carried by said first part, said surface lies within a generally horizontally disposed plane, said slot is formed in said other part and lies within a generally vertically disposed plane.

* * * * *